Figure 5:

(No Model.) 2 Sheets—Sheet 1.

F. LAMPLOUGH.
AUTOMATIC DRAIN VALVE AND STEAM TRAP.

No. 515,294. Patented Feb. 20, 1894.

Witnesses.
Chas. W. Parker
Jos. H. Milans

Inventor,
Frederick Lamplough,
by H. N. Low
atty (No Model.) 2 Sheets—Sheet 2.
F. LAMPLOUGH.
AUTOMATIC DRAIN VALVE AND STEAM TRAP.
No. 515,294. Patented Feb. 20, 1894.
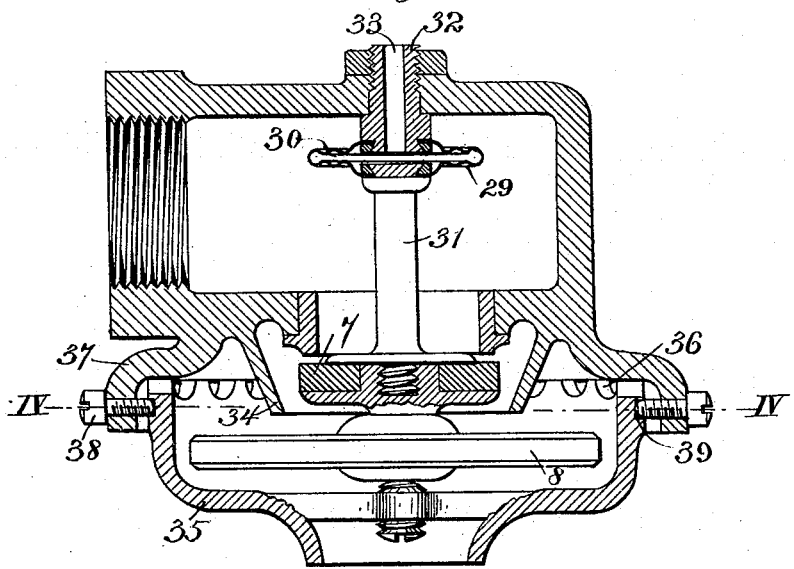
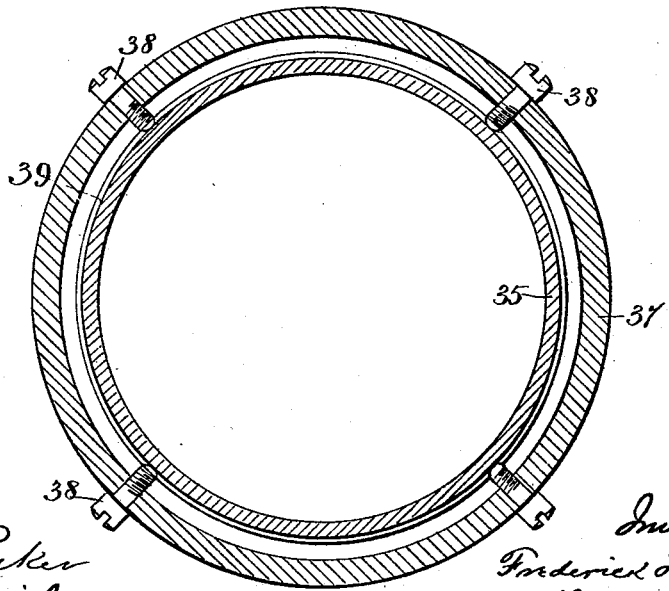
Witnesses
Geo. W. Parker
Jos. H. Milans
Inventor,
Frederick Lamplough,
by N. N. Lower
atty.

UNITED STATES PATENT OFFICE.

FREDERICK LAMPLOUGH, OF NEW YORK, N. Y., ASSIGNOR OF ONE-HALF TO THOMAS P. BORDEN, OF ENGLEWOOD, NEW JERSEY.

AUTOMATIC DRAIN-VALVE AND STEAM-TRAP.

SPECIFICATION forming part of Letters Patent No. 515,294, dated February 20, 1894.

Application filed October 12, 1893. Serial No. 487,946. (No model.)

*To all whom it may concern:*

Be it known that I, FREDERICK LAMPLOUGH, a subject of the Queen of Great Britain, residing at New York, in the county of New York, State of New York, have invented certain new and useful Improvements in Automatic Drain-Valves and Steam-Traps; and I do declare the following to be a full, clear, and exact description of the invention, such as will enable others skilled in the art to which it appertains to make and use the same.

My invention relates to that class of traps employed in engines, radiators, drains or in other situations where it is desired to permit the escape of liquids, such as water of condensation, and prevent the escape of a vapor such as steam.

My improved trap depends in operation upon the principle of movement by expansion and contraction under changes of temperature. That is to say, the escape of vapor from the trap when it is open, will cause an expansion and a movement which will close the trap, whereupon the consequent change in temperature to a lower degree in the part or parts formerly acted upon by the steam or vapor, will result in a reverse movement and cause the trap to open to its position first referred to, permitting the discharge of any liquid which has in the meantime accumulated. This operation is automatic and continuous. I do not claim broadly the application of this principle to traps, but I have devised an improved construction in which the trap is very sensitive to changes of temperature and operates very quickly and perfectly; which is very compact in arrangement and adapted to be used in many places where a bulky device cannot be employed; the parts of which can conveniently be constructed and put together and can be readily taken apart for cleaning or repairs; in which the valve is in perfect equilibrium so that its operation is not in any way retarded or otherwise interfered with by the pressure of the steam or other vapor which is to be controlled, the expansion chamber of the trap at the same time being exposed to the outer or atmospheric air so as to be quickly cooled when the closure of the trap should take place. It results from the last mentioned feature of construction and operation, that a very small quantity of the steam or vapor which is to be retained will escape with the water of condensation which it is desired to be ejected. I furthermore provide a construction in which the trap valve is perfectly balanced so as to be sensitive in operation and which is nevertheless suitable for use with water or other fluid containing grit or other impurities which are likely to impede the operation of any equilibrium device of ordinary construction.

The further features of advantage of my present improvement will be hereinafter more particularly set forth.

With such objects in view my invention consists in the parts and combinations thereof hereinafter set forth and claimed.

In order to make my improvement more clearly understood I have shown in the accompanying drawings means for carrying the same into practical effect, without however confining the invention in its useful applications, to the particular construction which, for the sake of illustration, I have delineated.

Figure 1:
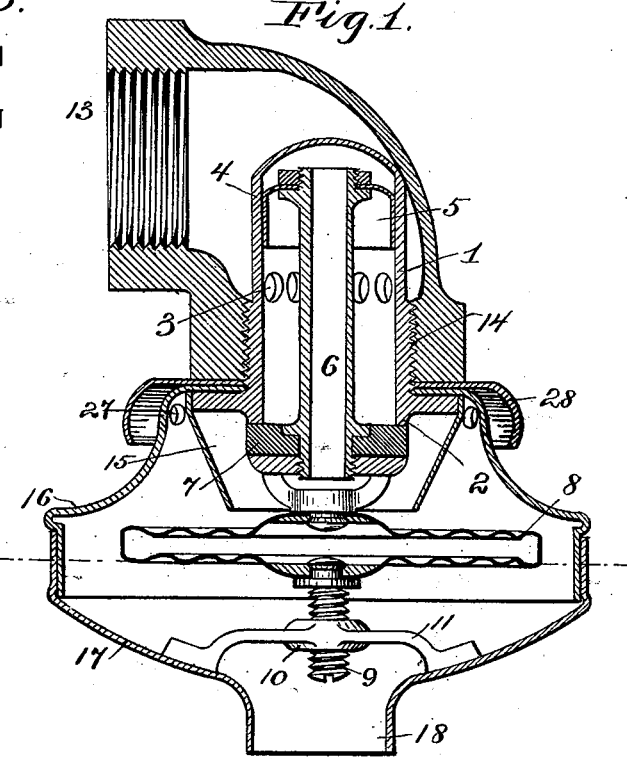
Figure 6:
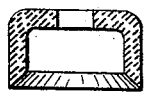
Figure 2:
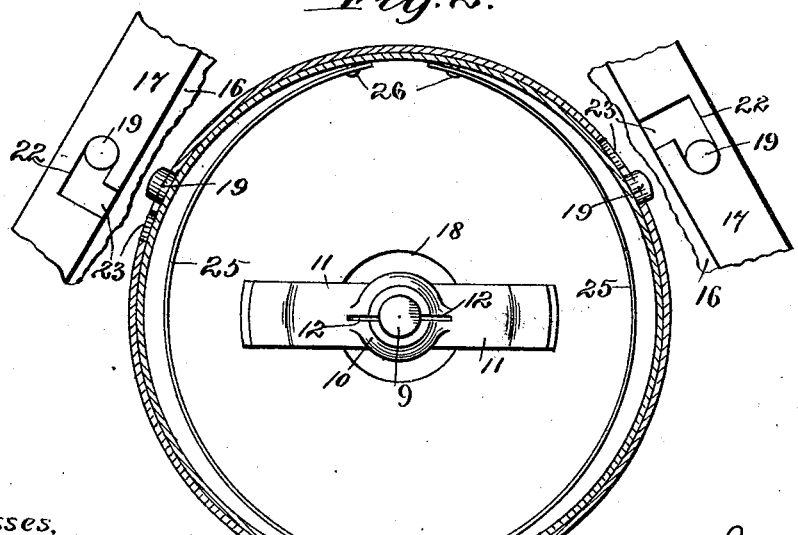

In said drawings:—Figure 1 is a vertical sectional view of an automatic trap embodying my improvement. Fig. 2 is a horizontal sectional view on line II—II of Fig. 1, showing also by side views the means of uniting the two portions of the trap casing. Fig. 3 is a vertical sectional view of another form of automatic trap also embodying my improvement. Fig. 4 is a sectional view on line IV—IV, Fig. 3, showing the mode of connecting the discharge chamber with the main portion of the trap. Figs. 5 and 6 are detail views showing different forms of equilibrium pistons for the trap valve.

Referring to said drawings 1 indicates a casing formed of brass or other suitable material and provided at its lower end with a valve seat 2. At a suitable point above the said valve seat the casing has one or more perforations 3 through which the liquid to be discharged from the trap is admitted to the interior of the casing. The upper portion of the latter forms a cylinder 4 closed at its upper end and adapted to receive a close fitting piston 5. The latter is preferably formed of thin copper stamped into bell shape and possessing a certain amount of resilience.

Secured to the piston 5 and having a central opening which communicates with the space in the casing and above the piston, is a tube 6 which extends to the lower end of the casing and carries the valve 7 faced with rubber or any other appropriate material adapted to make a tight closure upon the valve seat 2 when forced upward against the same.

8 is a vacuum and expansion chamber tightly sealed and formed of thin elastic metal the top and bottom heads or diaphragms of which are adapted to be readily caused to approach each other or to be forced apart by the formation of a vacuum within the said chamber or by the outward pressure of any vapor which may be caused to be generated or expand within it. For this purpose I prefer to partly charge the chamber 8 before it is exhausted and sealed with a highly volatile fluid such as ammonia, or other fluid with a like vaporizing power adapted to be quickly acted upon by changes of temperature. The lower head of the chamber 8 is supported by a vertically adjustable set-screw 9 mounted in a stationary seat or nut 10. This latter is by preference formed integral with a cross bar 11 adapted to be mounted upon any suitable support and which is formed with a vertical longitudinal cut or slit 12 passing through the screw seat and which permits the two portions of the nut to be sprung slightly apart upon the insertion of the screw. The latter is somewhat larger than the female screw-threaded bearing within the nut and fits tightly within the latter, so as to be held securely in place at whatever point of adjustment so that the necessity of any jam nut upon the screw is obviated.

The device as hereinbefore described is adapted to be secured to any coupling, pipe or chamber which contains or conducts the vapor from which the liquid of condensation is to be collected. In Fig. 1 of the drawings such chamber is indicated at 13 and consists of an ordinary elbow coupling into which the casing 1 is screwed by means of an external thread 14 formed upon the latter and engaging one of the screw-threaded openings of the elbow.

Attached to the lower end of the casing 1 is a funnel shaped plate 15 adapted to receive the steam or vapor as it is discharged between the valve seat 2 and the valve 7 and to direct it upon the vacuum and expansion chamber 8 so as to quickly affect the temperature of the latter and its contents and cause the valve to be promptly actuated and closed. This funnel also prevents the discharged water from splashing or blowing through the ventilating openings hereinafter described.

16 is a bell shaped discharge chamber which is preferably secured in place by having the internal flange at its upper end clamped between the casing 1 and the elbow or chamber 13, and which extends down over and covers the chamber 8 so as to conceal and protect the latter and receive the discharge from the valve. The lower end of the discharge chamber 16 is closed by a cover 17 which, like the chamber, may be formed of thin metal such as brass. This cover 17 serves as a stationary support for the cross bar 11 hereinbefore referred to and has a central discharge opening or nozzle 18. The said cover is united with the chamber 16 by any suitable form of joint, but preferably one which can be readily operated so as to detach the cover, permitting the removal of the vacuum and expansion chamber with its valve, tube 6, and piston 5, for cleaning or repair. For this purpose the chamber 16 is provided on its outer surface with pins 19, and with an aperture 20. The flange of the cover 17 is formed with an aperture 21 corresponding with the aperture 20 and with horizontal slots 22 adapted to receive the pins 19 and having vertical passages 23 at one end through which the pins may pass as the cover is thrust upward into position. When the cover is thus in place it may be given a short horizontal twist and the pins will be securely held in the horizontal slots 22.

To secure the cover from rotation I provide a pin 24 mounted upon a substantially circular spring 25 the ends of which latter are secured at 26 to the interior of the chamber 16. The pin 24 projects outwardly through the aperture 20, and is thrust back as the cover is forced upward, the spring 25 yielding for this purpose. When the cover is turned into its final position the pin 24 will spring outward through the aperture 21 and act as a lock. When it is desired to remove the cover the pin 24 is first pressed inward and then the cover may be freely rotated.

In order to permit thorough ventilation of the interior of the discharge chamber 16 so that a cool atmosphere may have ready access to the exterior of the chamber 8 and cause the prompt operation of the valve, I prefer to form in the upper part of the chamber 16 air openings 27 through which any warm air may escape, the place of which will be taken by a cooler air ascending through the nozzle 18.

28 is a hood clamped between the casing 1 and the chamber or elbow 13 and extending somewhat over the upper end of the discharge chamber and guarding the air apertures 27 thereof.

Any water of condensation accumulating in the chamber 13 will pass readily by the opening 3 to the interior of the valve casing 1 and collect above the valve 7. In the meantime this valve is held shut by an expansion or volatilization of the contents of the chamber 8 which has previously taken place by reason of the discharge of vapor or warm fluid from the trap. The action of the atmosphere upon the exterior of the chamber 8 as already described, will however soon lower the temperature of the latter with its contents, causing its heads or diaphragms to be drawn together and the valve 7 to be separated from the valve seat 2. Thereupon the water collected as aforesaid will immediately run out and over the vacuum and expansion chamber into the discharge chamber and then out through the discharge opening 18 of the latter. The warmth imparted by such fluid and by a small quantity of the vapor which will follow it through the open valve will immediately act upon the chamber 8, being directed fully upon it by the funnel 15, and will raise the temperature of the contents of the chamber, volatilizing the ammonia contained therein, and cause the prompt closure of the valve 7 upon the seat 2. Thereupon the collection of water will proceed as above described, to be again in like manner discharged. It will be observed that at all times the valve 7 is in perfect equilibrium, the pressure upon the upper surface exposed to the action of the vapor within the chamber or coupling 13 being exactly balanced by that upon the lower surface of the piston 5. This latter pressure will keep the said piston always tightly expanded in place against the inner surface of the cylinder or hood 4. This upward pressure upon the under side of the piston is entirely unresisted by reason of the opening through the tube 6 which places the space above the piston in constant communication with the atmosphere. Or to express this invention in different words, the tube 6 and piston 5 may be considered as extensions of the valve 7 and as portions thereof, and the top surface of the piston as the inner face of the valve, which inner face is cut off or separated from the steam chamber of the trap by means of the hood or casing 4. The piston 5 may be formed in the manner hereinbefore particularly described, or may be a piston of ordinary character provided with a fibrous packing. Or it may be formed in bell shape as indicated but of rubber of suitable composition to resist a considerable degree of heat. These last mentioned forms of piston are shown respectively in Figs. 5 and 6. The plate which constitutes in effect the inner surface of the trap valve may however be so constructed and combined with other parts as to obviate the sliding contact which must take place where a piston like that indicated at 5 is employed. The construction now about to be referred to is therefore especially desirable for use in a water or liquid in which there is present a grit or other impurities calculated to clog and impede the action of a piston.

Referring especially to Fig. 3 it will be observed that there is connected with the valve a plate or diaphragm having a certain elasticity or resilience, with which plate there is combined a chamber covering one side of the plate and having a duct or opening communicating with the same atmosphere as that to which the outer or under side of the trap valve is exposed. Such plate or diaphragm is indicated at 29, and the said chamber at 30. This chamber may be made in all essential respects similar to the principal vacuum or expansion chamber, the plate 29 constituting one of the heads or diaphragms. Such plate is secured to the stem or extension 31 of the valve, which in this instance is made solid in that respect differing from the tube or stem 6. The other head or diaphragm of the chamber 30 is soldered or otherwise securely fastened to a screw-threaded thimble 32 which latter is removably mounted in the upper portion of the steam chamber. This thimble or bushing, by means of a passage or conduit 33, has a communication with the atmosphere. With this form of device no difficulty can occur in the operation of the valve by reason of any grit or impurity which may enter the steam chamber with the steam or water of condensation.

In the form of trap illustrated in Fig. 3 the funnel which directs the water and steam inward upon the vacuum chamber is cast integral with the steam chamber as indicated at 34, and the discharge chamber is formed by a casting 35 the upper edge of which is provided with notches or perforations 36 for ventilation and to promote the cooling of the vacuum chamber. The upper edge of the casting 35 fits within a depending shield 37 which is cast integral with the main body or steam chamber of the trap. Set screws 38 passing through said shield engage the outer face of the casting 35 and hold the latter in position, the shield 37 being of such larger diameter than the casting 35 as to leave an annular space communicating with the atmosphere and with the openings 36. The casting 35 carries the stationary nut and set screw for adjusting the vacuum chamber in the same manner already described in connection with Fig. 1. To make more secure the engagement of the set screws 38 the casting 35 is formed with a peripheral groove 39 into which the inner ends of said screws enter.

By employing as the means for actuating the trap valve a vacuum chamber I am enabled to insure that the valve shall be operated by a very strong pressure, as high as fifteen pounds to the square inch, thus making certain the action of the trap.

I do not in this application claim a valve-actuating vacuum chamber partly charged with a volatile fluid, the same being the subject in part of my application, Serial No. 491,068, filed November 15, 1893.

What I claim is—

1. In a trap the combination with the closed chamber adapted to operate under changes of temperature as described, of a casing having a valve seat, a valve movable toward and from said seat and in the direction of the expansion and contraction of the chamber, said valve being connected with and operated by the chamber, and means whereby said valve is placed in equilibrium and relieved from unbalanced steam pressure, substantially as set forth.

2. In an automatic trap the combination with the valve, and the closed chamber connected with and adapted to operate the same, of a plate connected with said valve and of substantially the same area as that face of the valve which is exposed to steam pressure, and means whereby the outer face of said plate is cut off from steam pressure and exposed to atmospheric pressure, or to the same pressure to which the outer face of said valve is exposed, substantially as set forth.

3. In an automatic trap the combination with a casing having a valve seat, of an expansion chamber, a valve connected with and actuated by said chamber and movable toward and from said seat in the direction of the movement of the chamber, a plate or piston connected with the valve, and means for cutting off one surface of said plate from the steam chamber of the trap so that said plate operates to balance the valve, substantially as set forth.

4. In an automatic trap the combination of a casing having a valve seat, an expansion chamber, a valve connected with and operated by said chamber, and movable toward and from said seat in the direction of movement of the chamber, a plate connected with the valve, a chamber covering one side of said plate, and a duct or opening by which said chamber is placed in communication with the same atmosphere as the outer side of the valve, substantially as set forth.

5. In an automatic trap the combination with an expansion or vacuum chamber operating by changes of temperature and pressure as described, of a casing having a valve seat, a valve connected with the chamber and adapted to engage said seat, a plate or piston connected with the valve and a partition or chamber covering said plate or piston and serving to cut off the inner face thereof from the steam chamber of the trap, the space above the said plate or piston having communication with the atmosphere to which the outer face of the valve is exposed, substantially as set forth.

6. In an automatic trap the combination of the casing 1 having the valve seat 2, the valve 7 having the tube 6 and piston 5, the partition or chamber 4 covering said piston, and means for actuating the valve, substantially as set forth.

7. In an automatic trap the combination with the valve, and the vacuum chamber for operating it, of a flange or funnel surrounding the valve opening for directing the discharge therefrom upon the vacuum chamber, substantially as set forth.

8. In an automatic trap the combination with the valve, of the vacuum chamber 8 connected therewith, the bridge or bar 11 having stationary nut 10 having the slit 12, extending on each side of the nut opening and the set screw 9 fitting in said nut and engaging the chamber 8, substantially as set forth.

9. In an automatic trap the combination with the valve and vacuum chamber, of a discharge chamber inclosing the latter and having projections or pins 19, a cover for said discharge chamber having the slots 22, 23, and a pin 24 having an actuating spring and engaging said discharge chamber and cover to prevent the rotation of the latter, substantially as set forth.

In testimony whereof I affix my signature in the presence of two witnesses.

FREDERICK LAMPLOUGH.

Witnesses:
 J. W. HOWE,
 THOS. P. BORDEN.